May 21, 1929.　　　　C. C. PARRISH　　　　1,713,916
MOTOR CONTROL DEVICE
Filed Dec. 15, 1926　　　3 Sheets-Sheet 1
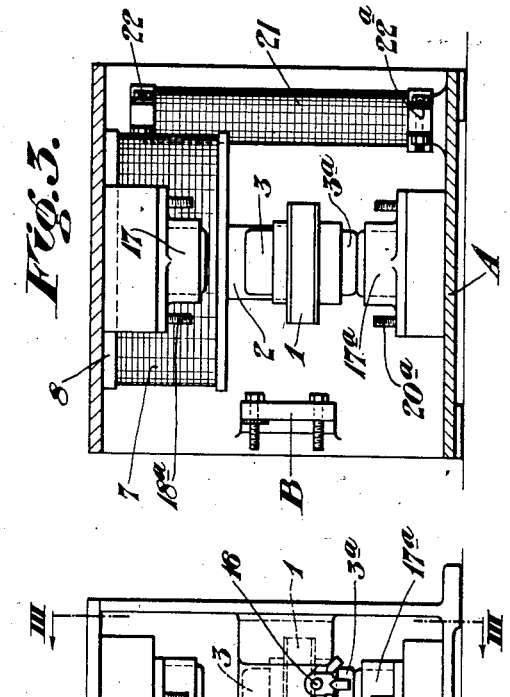
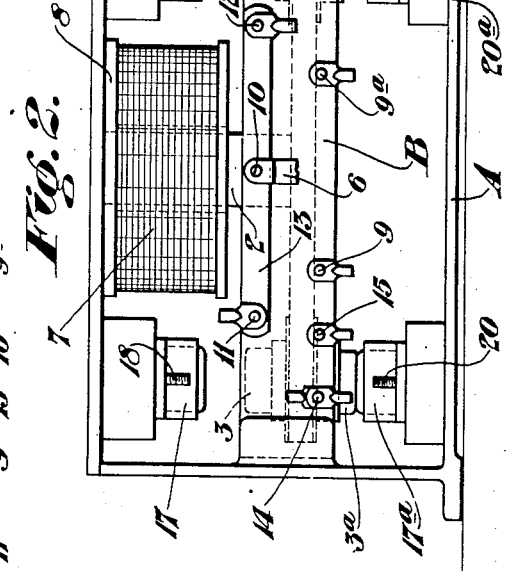
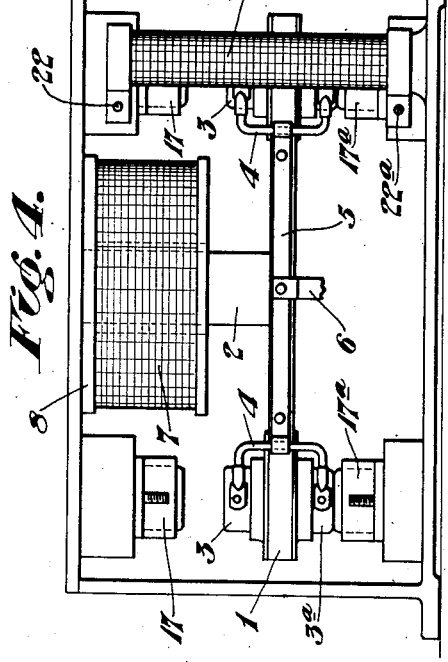
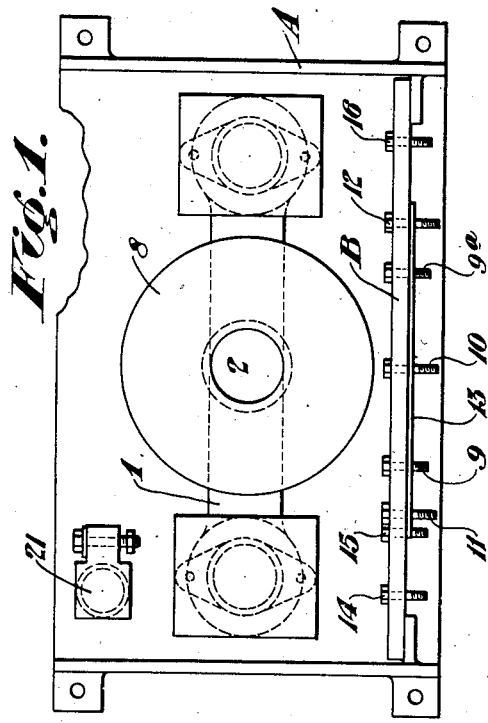
Inventor:
CECIL C. PARRISH,
by: D. Anthony Usina
his Attorney.

May 21, 1929.                C. C. PARRISH                1,713,916
                         MOTOR CONTROL DEVICE
                         Filed Dec. 15, 1926        3 Sheets-Sheet 2
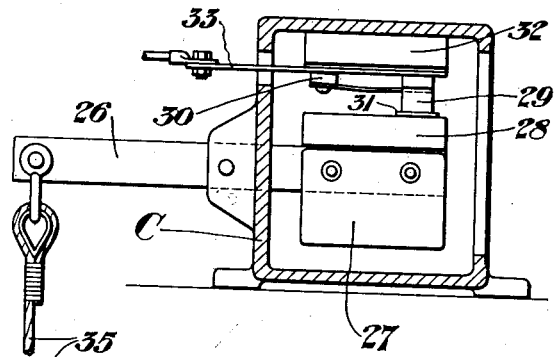
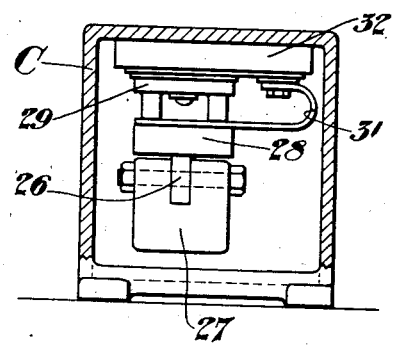
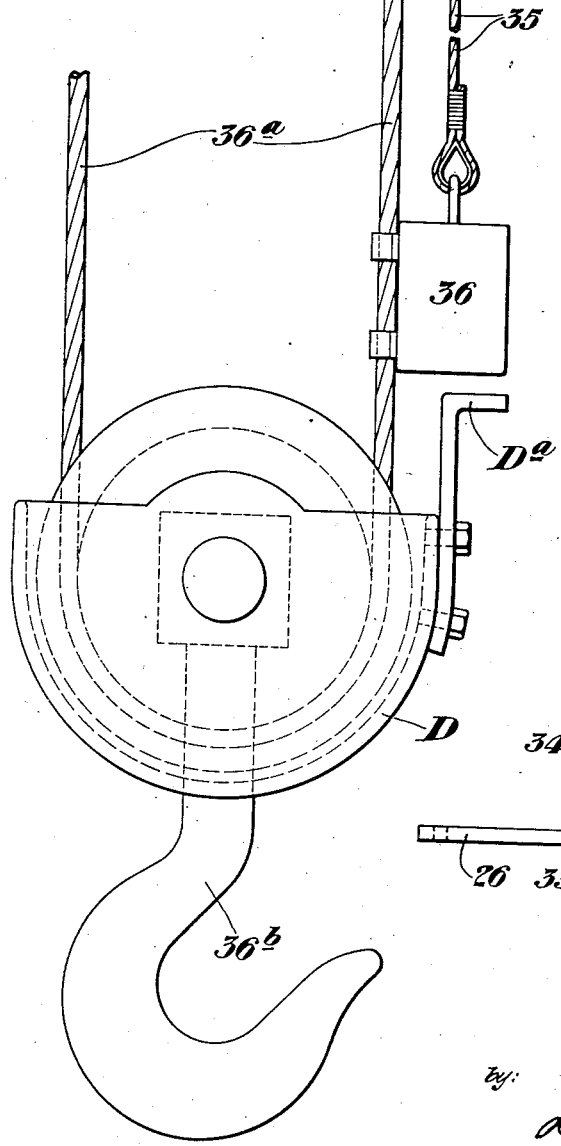
Inventor:
CECIL C. PARRISH,
by: D. Anthony Usina
            his Attorney.

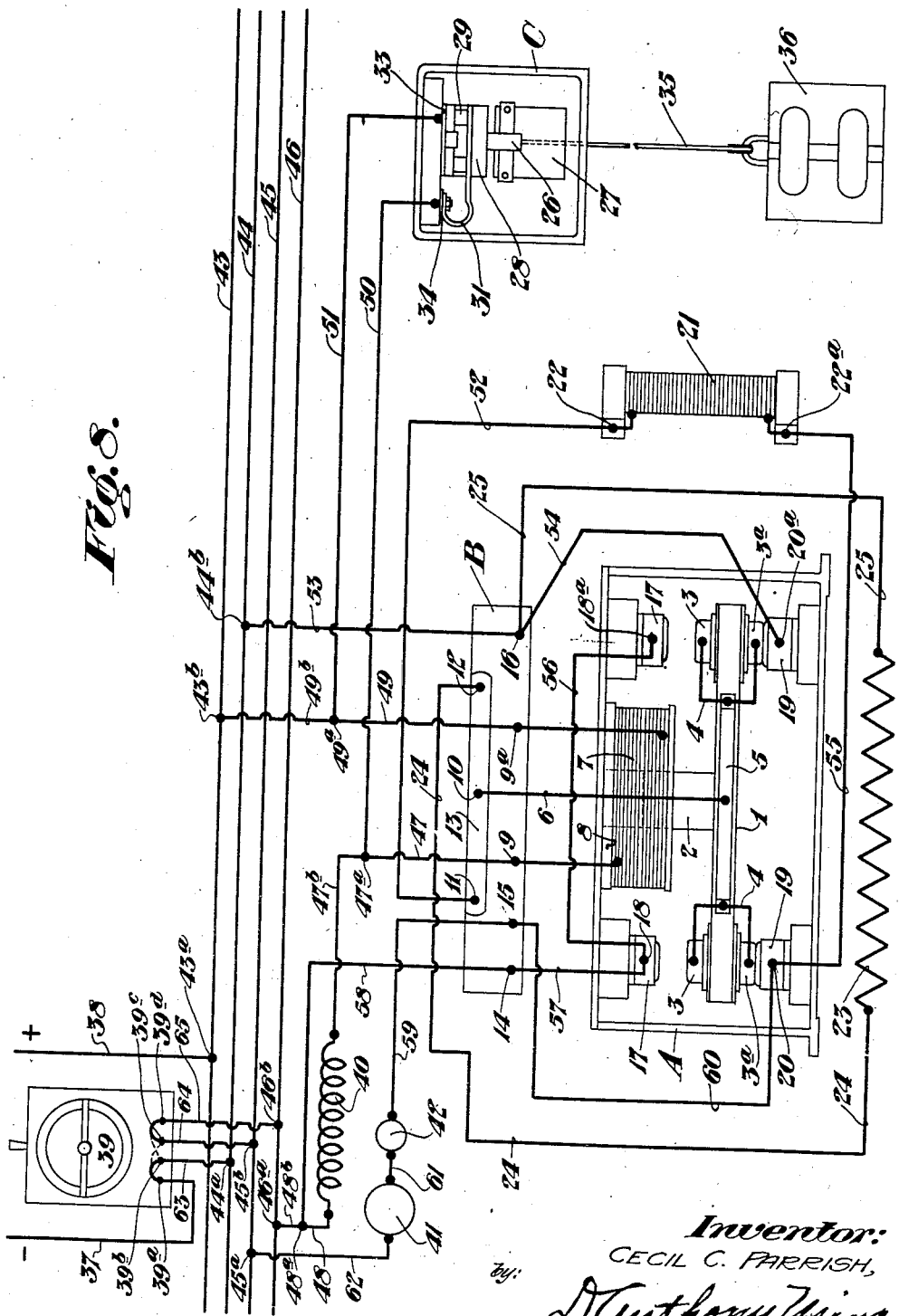

Patented May 21, 1929.

1,713,916

UNITED STATES PATENT OFFICE.

CECIL C. PARRISH, OF DONORA, PENNSYLVANIA.

MOTOR-CONTROL DEVICE.

Application filed December 15, 1926. Serial No. 155,003.

This invention relates to motor control devices and more particularly to an automatic reversing and safety limit stop for use on cranes and other lifting devices, and has for one of its objects the provision of a control switch adapted to prevent the overrunning of the hoisting element of such devices.

Another object is to provide a control mechanism which will normally remain in position to complete the field circuit to the motor being controlled, in the direction of operation, and will when tripped automatically short circuit the armature with a series brake and a resistance unit to stop the motor.

A further object is to provide a control mechanism of the class described composed of a main switch unit and a short circuit unit, so that the main switch unit may be located at any convenient place upon the hoisting mechanism, while the relatively small short circuit unit is mounted in a position relatively close to the hoisting element.

A still further object is to provide a control mechanism of the class described having the novel construction, combination, and design of parts hereinafter described and illustrated in the accompanying drawings.

In the drawings—

Figure 1 is a top plan of a switch unit constructed in accordance with this invention, having the top cover plate removed.

Figure 2 is a front side elevation thereof, with the front side plate removed.

Figure 3 is an end elevation taken on line III—III of Figure 2.

Figure 4 is a rear side elevation.

Figure 5 is a top plan of the short circuiting unit used in connection with the switch of Figures 1 to 4 inclusive.

Figure 6 is a side elevation of the short circuiting unit.

Figure 7 is an end view of the short circuiting unit.

Figure 8 is a general wiring diagram showing the switch unit and short circuiting unit wired up in connection with a motor series brake and standard reversing controller.

Referring more particularly to the drawings, the letter A designates the switch casing as a whole, which is adapted to house the switch mechanism. A contact arm 1 is arranged within the casing A and carries a solenoid plunger 2. A pair of top contact members 3 are mounted one at each end of the contact arm 1, and a second pair of contact members $3^a$ are mounted one at each end on the bottom side of the contact arm 1. The contact members 3 and $3^a$ at each end of the contact arm 1 are electrically connected by connectors 4, and a bus bar 5 connects the connectors 4 with a flexible connector or lead 6.

A series operating coil 7 wound upon a spool 8 is mounted within the casing A and adapted to cooperate with the solenoid plunger 2. The ends of the winding of the coil 7 terminate at taps 9 and $9^a$, respectively, and the connector or lead 6 terminates at a tap 10. The taps 9, $9^a$ and 10, together with terminal taps 11 and 12, have a bus bar 13 which connects the taps 10, 11 and 12, and other taps 14, 15 and 16 are mounted on a terminal board B within the casing A. A pair of upper or top stationary contact members 17 are mounted within the casing A in position to be engaged by the contact members 3 on the contact arm 1. The contact members 17 are provided with terminal taps 18 and $18^a$. A pair of bottom or lower stationary contact members 19 are mounted within the casing A in position to be engaged by the lower contact members $3^a$. The contact members 19 are provided with taps 20 and $20^a$.

A spool is mounted within the casing A and is provided with a resistance winding 21. The ends of the winding 21 terminate at taps 22 and $22^a$. A second resistance 23 is mounted below the casing A with the ends of the winding connected at taps 12 and 16 by wires 24 and 25, respectively. The resistance 23 has approximately ten times greater ohmic value than the resistance 21 and the brake coil (to be described).

The short circuiting unit of Figures 5, 6 and 7 has a casing or housing designated generally by the letter C, which houses the working parts of the unit. A lever arm 26 is pivotally supported in the casing C and carries a counterweight 27.

An insulating block 28 is mounted on the lever 26 and carries a contactor 29, a flash contact 30 and a flexible connector 31. Mounted in the casing C is an insulator block 32 carrying contact bars 33 and 34, and one end of the flexible connector 31 is attached to the contact bar 34. The outer end of the lever arm 26 is provided with a short length of flexible cable, chain or the like 35, from which depends a weight element 36.

In Figure 6 I have shown the short circuiting unit with the weight 36 in operative connection with the hoisting rope 36ª of a crane hook 36ᵇ.

Referring now to Figure 8 in which a diagram of the circuits made by the motor control mechanism above described is illustrated, the numeral 37 designates the negative feed line terminating at a tap 39ª. The numeral 38 designates the positive feed line, and the numeral 39 designates the controller which may be of any standard design. The field of the motor to be controlled is designated by the numeral 40, and the motor armature by the numeral 41, while the series brake is designated by the numeral 42. Four conductor lines are shown as follows—line 43 with terminal taps 43ª and 43ᵇ; line 44 with terminal taps 44ª and 44ᵇ; line 45 with terminal taps 45ª and 45ᵇ; and line 46 with terminal taps 46ª and 46ᵇ.

Connecting the terminal tap 9 on the switch unit with the motor field 40, are wires 47 and 47ᵇ with an intermediate tap 47ª. Connecting the motor field 40 with the conductor 46 are wires 48 and 48ᵇ with an intermediate tap 48ª, the wire 48ᵇ terminating at the tap 46ª in the wire 46. Connecting the terminal tap 9ª with the conductor wire 43 are wires 49 and 49ᵇ with an intermediate tap 49ª, the wire 49ᵇ terminating at the tap 43ᵇ in the wire 43. Connecting the tap 47ª with the bar 34 of the short circuiting unit is a wire 50, and a wire 51 connects the tap 49ª with the contactor bar 33 of the short circuiting unit.

The taps 11 and 22 are connected by a wire 52, while the taps 16 and 44ᵇ are connected by a wire 53. The taps 16 and 20ª are connected by a wire 54, and the taps 20 and 22ª are connected by a wire 55. The taps 18 and 18ª are connected by a wire 56, and a wire 57 connects the taps 18 and 14. The taps 14 and 48ª are connected by a wire 58. A wire 59 connects the terminal tap 15 with the series brake 42, and a wire 60 connects the tap 15 to the tap 20. The motor armature 41 and the series brake are connected by a wire 61, and a wire 62 connects the motor armature 41 and conductor 45, the wire 62 terminating at the tap 45ª in the wire 45. A wire 63 connects the tap 39ᵇ on the controller 39 with the tap 44ª on the conductor 44. A wire 64 connects a terminal 39ᶜ on the controller 39 with the tap 45ᵇ in the conductor 45. A wire 65 connects a tap 39ᵈ on the controller 39 with the tap 46ᵇ in the conductor 46. The positive line 38 is connected to the conductor 43 at the terminal tap 43ª.

Assuming that a load is to be raised by the hook of the lifting element or crane, the controller 39 will be moved to the proper position to make a circuit through the positive line 38 to the tap 43ª, conductor 43 to tap 43ᵇ, wire 49ᵇ to the tap 49ª, and through the wire 51 to the connection with the bar 33 in the short circuiting contactor, thence through the contact 29 and flexible connector 31 to the bar 34 and wire 50 to the tap 47ª, and wire 47ᵇ to the motor field 40. From the motor field 40 the circuit continues through the wire 48, tap 48ª and wire 48ᵇ to the tap 46ª, and conductor 46 to tap 46ᵇ. From the tap 46ᵇ the circuit is continued through the wire 65 to tap 39ᵈ on the controller 39, thence through the controller 39 to tap 39ᶜ, and from the tap 39ᶜ through the wire 64 to tap 45ᵇ, conductor 45 to the tap 45ª. From the tap 45ª the circuit is continued through the wire 62 to the motor armature 41, through the armature 41 and wire 61 to the series brake 42, through the brake 42 to the wire 59 to tap 15, thence through the wire 60 to the tap 20, and through the contacts 19 and 3ª, connector 4 on one end of the contact arm 1 to bus bar 5, and through the connector 4 on the other side of the contact arm 1 to contacts 3ª and 19, thence out through the tap 20ª and wire 54 to the tap 16. From the tap 16 the circuit is continued through the wire 53 to the tap 44ᵇ, conductor 44 to tap 44ª, wire 63 to tap 39ᵇ, and through the controller 39 to the tap 39ª, and thence to the minus or negative line 37 completing the circuit.

When the load or lifting element is raised to a predetermined height which is determined by the position of the weight 36, a lifting arm Dª on the lifting element D will engage and lift the weight 36. The lifting of the weight 36 will permit the counterweight 27 on the lever arm 26 to rock the lever arm and break the contact between the contactor 29 and the bar 33, thereby breaking the normal operating circuit described above, and reestablish a circuit as follows—

From the tap 49ª the circuit is made through the wire 49 to a tap 9ª, then through the series operating coil 7, so as to energize the coil 7 and attract the plunger 2. When the plunger 2 is attracted by the coil 7 the plunger and contact arm 1 will move upwardly and disengage contacts 3ª and 19, and engage contacts 3 and 17, thereby cutting resistance coil 23 into the motor circuit, and also connecting resistance coil 21 and brake 42 in series across the motor armature 41 so as to reestablish a circuit as follows—

From the plus or positive line 38 of the tap 43ª, through the conductor or wire 43 to the tap 43ᵇ, thence through the wire 49ᵇ to the tap 49ª, then through the wire 49 to the tap 9ª on the bar B, and through the operating coil 7 to the tap 9 on the bar B. From the tap 9 the circuit is continued through the wires 47 and 47ᵇ to the motor field 40 and wire 48 to the tap 48ᵃ, thence through the wires 58 and 57 to the tap 18, and through the contacts 17 and 3 and connector bar 4 to the bus bar 5. The circuit continues through the flexible connector 6 to the tap 10 on the bus bar 13 and through the bus bar 13 to the tap 12, thence through the line or wire 24 and resistance 23, to wire 25 and to tap 16. From tap 16 the circuit continues through the wire 53 to tap 44ᵇ on the conductor 44 to tap 44ᵃ, and thence through wire 63 to the tap 39ᵇ on the controller 39 and through the controller 39 to the tap 39ᵃ, and thence out through the minus or negative line 37 completing the circuit. Simultaneously with the above circuit there also will be a local dynamic braking circuit established from the terminal tap 48ᵃ through the wire 48ᵇ to the tap 46ᵃ and through the conductor 46 to the tap 46ᵇ, then through the wire 65 to the tap 39ᵈ on the controller 39, and through the controller to the tap 39ᶜ. From the tap 39ᶜ the circuit continues through the wire 64 to the tap 45ᵇ and through the conductor 45 and tap 45ᵃ to the wire 62, thence to the motor armature 41, through the motor armature 41 to the wire 61 to the series brake 42, and thence through the wires 59 and 60 to the tap 20. From the tap 20 the circuit is completed through the wire 55, resistance coil 21 and wire 52 to the tap 11 on the bus bar 13, and through bus bar 13 to the tap 10, thus dissipating the counter E. M. F. from the motor armature 41 in the coil 21 and brake 42, thereby permitting the brake 42 to be deenergized and applied when the counter E. M. F. has been dissipated.

Due to the fact that the resistance 23 has approximately ten times greater ohmic value than the resistance 21 and the brake coil, the current will follow the path of least resistance, during the load holding position of the apparatus, so that the major portion of the current will flow through wire 57, and out through the motor field 40, and operating coil 7 back to line, and only a negligible current leak if any will flow through the armature, brake, and coil 7. This leak of current will not be sufficient to operate or affect the elements in its path.

When the lifting element D is to be lowered, the controller 39 will be reversed so as to connect the terminal taps 39ᵃ to 39ᶜ and 39ᵇ to 39ᵈ, as indicated in dotted lines on Figure 8. The lowering circuit will thus be established from the minus or negative line 37 to the tap 39ᵃ, through the controller 39 to tap 39ᶜ, then through the wire 64 to the tap 45ᵇ, and then through the conductor or wire 45 to the tap 45ᵃ. From the tap 45ᵃ the circuit is continued through the wire 62 to the motor armature 41, through the wire 61 to the series brake 42 and through the wires 59 and 60 to the tap 20, then through the wire 55 to and through the resistance coil 21. From the coil 21 the circuit continues through the wire 52 to the terminal tap 11 on the bus bar 13 and through the bus bar 13 to the tap 10, thence to the flexible connector 6 to the bus bar 5 on the contactor bar 1, and from the bus bar 5 through the connector 4 to the contact 3, and through the contact 17 to the tap 18 and wires 57 and 58 to the tap 48ᵃ.

From the tap 48ᵃ the circuit continues through the wire 48 to the motor field 40 and through the wires 47ᵇ and 47 to the coil 7, through the coil 7 and wires 49 and 49ᵇ to the tap 43ᵇ on the conductor or wire 43 to the tap 43ᵃ and out the plus or positive line 38 completing the circuit.

As soon as the load has been lowered a sufficient distance to allow the weight 36 to hang free of the lifting element or shelf 50, the weight will rock the lever 26 against the pull of the counterweight 27 so as to engage the contact 29 and the bar 33 in the short circuiting unit. The engagement of the contactor 29 and bar 33 will short circuit the coil 7 so as to cause said coil to become deenergized and permit the contact 1 to drop by gravity and reestablish the lowering circuit as follows—

From the minus or negative line 37 through the controller 39 and wire 64 to the tap 45ᵇ in the wire 45 to the tap 45ᵃ, thence through the wire 62 to the motor armature 41, and through the armature 41 and wire 61 to the series brake 42. From the brake 42 the circuit continues through the wires 59 and 60 to the tap 20, thence through the contacts 19 and 3ᵃ and connector 4 to the bus bar 5. From the bus bar 5 the circuit is continued through the connector 4 on the opposite end of the contact arm 1, and through the contacts 3ᵃ and 19 to the tap 20ᵃ and through the wires 54 and 53 to the tap 44ᵇ on the conductor 44, thence through the conductor or wire 44 to the tap 44ᵃ and wire 63 to the controller 39. The circuit is then continued through the controller 39 to the wire 65 and through the wire 65 to the tap 46ᵇ on the conductor 46, then to the tap 46ᵃ and through the wires 48ᵇ and 48 to the motor field 40. The circuit is then continued through the motor field 40 and wire 47ᵇ to the tap 47ᵃ, thence through the wire 50 to the connection at 34 in the short circuiting unit C, and through the connector 31 to the contacts 29 and 33. From the contact 33 the circuit continues through the wire 51 to the tap 49ᵃ, and then through the wire 49ᵇ to the tap 43ᵇ on the conductor or wire 43 and to the tap 43ᵃ to the plus or positive line 38 completing the normal lowering circuit.

While I have shown and described a specific embodiment of my invention, it will be understood that I do not wish to be limited to the details thereof, since various combinations may be readily made by those skilled in the electrical art without departing from the scope of my invention as defined in the appended claims.

I claim:

1. The combination with a series motor having an armature, and a field, and a series brake, of control mechanism for said motor including an automatic switch having an operating position and a braking position, a series solenoid for actuating the switch to the latter position, a mechanical switch, said solenoid being in series with said field and in shunt with said mechanical switch, and said automatic switch in braking position being adapted to establish a local dynamic braking circuit through said armature and said brake.

2. An apparatus for controlling a series motor, comprising a series brake, an automatic switch and a mechanical switch, said automatic switch having a normal operating position and a braking position, said mechanical switch having an open position and a circuit closing position, series electro-magnetic means for moving the automatic switch to braking position, said electro-magnetic means being in series with the motor and in shunt with the mechanical switch, and said automatic switch in braking position being adapted to establish a local dynamic braking circuit through the armature and brake by which dynamic braking is effected.

3. The combination with an electrically operated crane hoist having a lifting element and including a series motor having an armature and a field, and a series brake, of control mechanism therefor including an automatic switch and a mechanical switch, said automatic switch having a normal operating position and a braking position, said mechanical switch having an open position and a circuit closing position, a series electro-magnetic means for moving said automatic switch into braking position, said electro-magnetic means being in series with said motor field and in shunt with said mechanical switch, means operable by said lifting element for operating said mechanical switch, and said automatic switch in braking position being adapted to establish a local dynamic braking circuit through said motor armature and said series brake through which dynamic braking is effected.

4. The combination with an electrically operated crane hoist having a lifting element, and including a series motor having an armature and a field, a series brake, and two resistance units, of a control mechanism including an automatic switch and a mechanical switch, said automatic switch having a normal operating position and a braking position, said mechanical switch having an open position and a circuit closing position, a series electro-magnetic means for moving said automatic switch into braking position, means operable by said lifting element for opening said mechanical switch so as to energize said electro-magnetic means by putting said electro-magnetic means in series with said motor field, said automatic switch in braking position being adapted to establish a local dynamic braking circuit through the armature, brake, and one of said resistance units, said brake and last named resistance unit being adapted to dissipate the energy developed by the counter E. M. F. of said dynamic braking circuit, and said automatic switch in braking position also being adapted to put the other of said resistance units in series with said motor field so as to govern the excitation of said field and thereby govern the counter E. M. F. generated by said motor.

5. The combination with a series motor having an armature and a field, a series brake, and a resistance unit, of a control mechanism including an automatic switch having a normal operating position and a brake position, a series electro-magnetic means for operating the automatic switch to braking position, a mechanical switch, said electro-magnetic means being in series with said field and in shunt with said mechanical switch, and the automatic switch in braking position being adapted to shunt the armature circuit of the motor with said brake and said resistance element.

6. The combination with a series motor operated hoisting crane, said motor having an armature and a field, a series brake, and a lifting element adapted to be operated by said motor, of a control mechanism including an automatic switch and a mechanical switch, said automatic switch having a normal operating position and a braking position, said mechanical switch having an open position and a circuit closing position, a series electro-magnetic means for operating said automatic switch to braking position, said electro-magnetic means being in series with the field of said motor and in shunt with said mechanical switch, and the automatic switch in braking position being adapted to shunt the normal armature circuit of said motor through a resistance unit so that the motor may act as a generator and create a counter E. M. F. which has its energy dissipated through said resistance unit and said brake.

In witness whereof, I have hereunto signed my name.

CECIL C. PARRISH.